B. B. NEAL & W. S. THOMSON.
INTRENCHING TOOL.
APPLICATION FILED MAY 6, 1915.
1,175,552.
Patented Mar. 14, 1916.
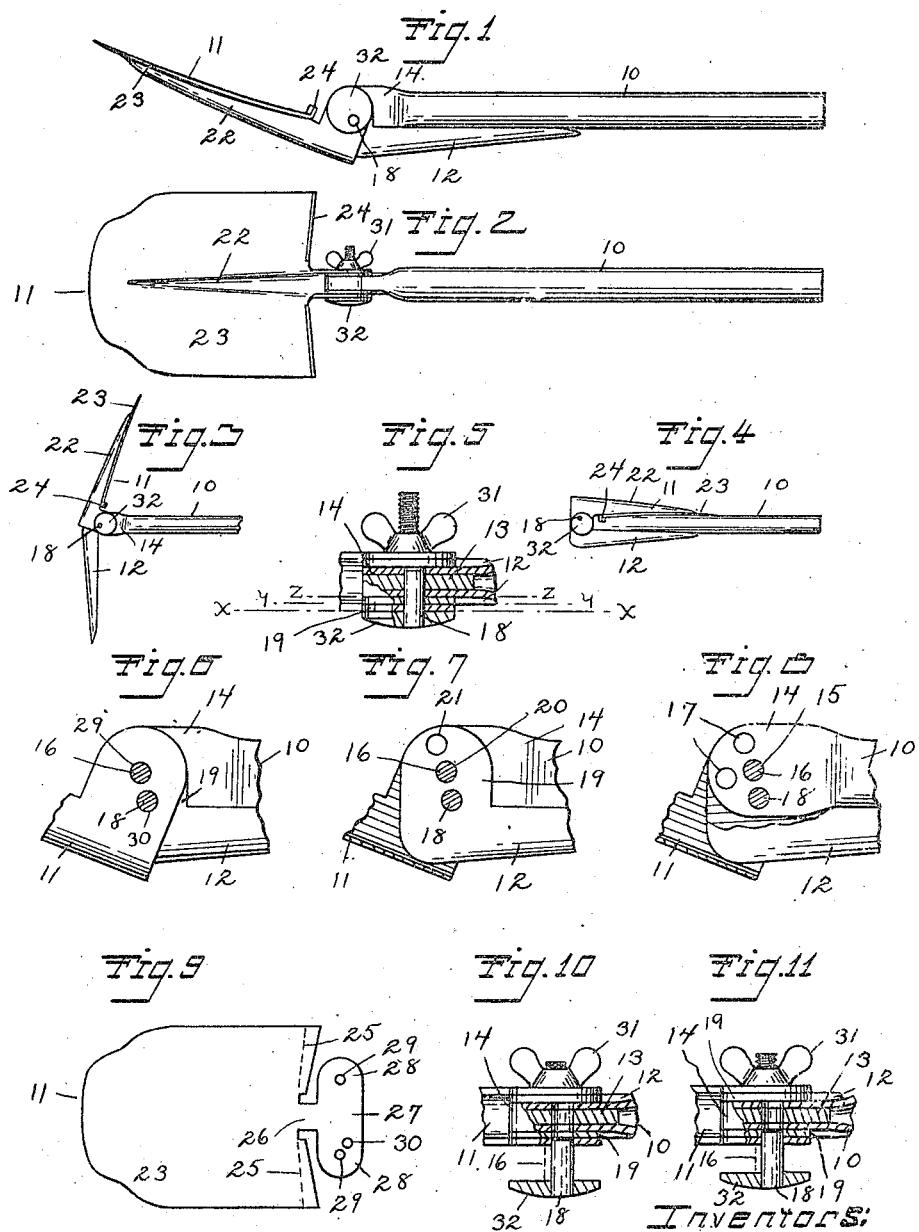

UNITED STATES PATENT OFFICE.

BERNARD B. NEAL, OF BROOKLYN, NEW YORK, AND WILLIAM S. THOMSON, OF PLANTS-VILLE, CONNECTICUT, ASSIGNORS TO THE H. D. SMITH & COMPANY, OF PLANTS-VILLE, CONNECTICUT, A CORPORATION.

INTRENCHING-TOOL.

1,175,552.  Specification of Letters Patent.  Patented Mar. 14, 1916.

Application filed May 6, 1915. Serial No. 26,284.

*To all whom it may concern:*

Be it known that we, BERNARD B. NEAL, a citizen of the United States, residing at Brooklyn, in the county of Kings and State of New York, and WILLIAM S. THOMSON, a citizen of the United States, residing at Plantsville, in the county of Hartford and State of Connecticut, have invented certain new and useful Improvements in Intrenching-Tools, of which the following is a specification.

Our invention relates to improvements in intrenching tools, and the object of our improvement is simplicity and economy in construction and convenience and efficiency in use.

In the accompanying drawings: Figure 1 is a side elevation of our improved intrenching tool. Fig. 2 is a plan view of the same. Figs. 3 and 4 are side elevations on a reduced scale of the same showing the parts in different positions. Fig. 5 is a fragmentary view, on an enlarged scale, part in plan and part in section, showing the joint and parts adjacent thereto. Fig. 6 is a sectional view on the line $x\,x$ of Fig. 5. Fig. 7 is a sectional view on the line $y\,y$ of Fig. 5. Fig. 8 is a sectional view on the line $z\,z$ of Fig. 5. Fig. 9 is a plan view of the blank for the shovel or spade member. Figs. 10 and 11 are views, corresponding to Fig. 5, with the locking pin in different positions.

Our improved intrenching tool comprises a handle 10, and tools consisting of a shovel or spade 11 and a pick 12 connected thereto by a joint that permits of collapsing the same into compact form, as shown in Fig. 4, with the tools alongside the handle, and for opening the tools out and adjusting the same to different positions.

The handle 10 consists of a relatively short piece of metal tubing, flatted at the joint end as shown to form a head 14 and having the said joint end filled by a plug 13. The joint head 14 is provided with a hole 15 for the pivot bolt 16, and concentric therewith is a set of holes 17, shown as three in number, for the positioning or locking pin 18.

The pick 12 is made of sheet metal, curled into U-shape, tapering to a point at the free end, and provided at the joint end with a pair of ears 19 that fit over the joint head 14 of the handle 10. The ears 19 have each a hole 20 for the pivotal bolt or pin 16 and one of the said ears 19 has a pair of holes 21 for the locking pin 18 and positioned so that they may be brought into registration with the locking pin holes 17 in the joint head 14 under certain positions of adjustment to be described.

The shovel 11 is made of sheet metal, comprises a body portion or a blade 23 of suitable width and depth, and shape, and has a rib 22 formed by suitably indenting the material to approximately U-shape, somewhat like the shape of the pick 12. The top edge portion of the blade 23 is provided with a lip or flange 24 at the sides, formed by turning over the narrow wings 24 shown in the blank, Fig. 9, along the lines 25, which serve as a guard to protect the foot of the operator. Between the wings 24 there is a neck 26 which connects the body portion 23 with a laterally directed strap 27 having a hole 29 for the pivot pin 16 in the ends 28, and which strap is bent into U-shape suitably to permit the ends 28 to serve as ears for inclosing the ears 19 of the pick 12, and to have the holes 29 engaged by the said pivot pin 16. One of the ears 28 has a second hole 30 for engaging with the locking pin 18. As shown, the locking pin 18 is on the left side of the joint when the device is in position for use, and the corresponding ears 19 of the pick 12 and of the shovel 11 are provided with holes 17 and 29 as described for receiving the said locking pin 18.

The clamping and locking device comprises a body portion 16 that is a fit for the holes 15, 20 and 29 in the joint head 14, and ears 19 and 28, which body portion is threaded at the free or right hand end as shown, suitably to receive the clamping nut 31, and at the left end is provided with an enlarged head 32, suitable for engaging with the ear 28 opposed thereto, and of suitable size to cover the same. The locking pin 18 is secured in a part of the overhanging portion of the head 32, extends inwardly, parallel to the body portion 16, and in spaced relation thereto, suitably to engage with the locking holes 17, 21, and 29, and is of sufficient length, as shown in Fig. 5, to pass through the ear 28 opposed to the head 32 and the ear 19 between the said last named ear 28 and the joint head 14, and to enter an appreciable distance into the said joint head 14. It will be noted that the joint head 14 has three locking holes 17, the ear 19 has two locking holes 21 and the ear 28 has a single locking hole 29.

By unscrewing the clamping nut 31 and sliding the body portion 16 longitudinally, the locking pin may be disengaged from one group of locking holes and engaged with another group to make the desired adjustment of the parts. In making such changes, it is unnecessary to disengage the locking pin 18 from the single locking hole 30 provided in the shovel ear 28, as there is only a single locking hole 30 in this part, and the same will always be in use.

Considering the shovel 11, the locking hole 30 will be in registration with the lowermost hole 17 shown in Fig. 8 when the shovel is in the extended position, as shown in Figs. 1, 2 and 8, and the locking pin 18 will be engaged with the said lowermost hole. When turned to the closed position, shown in Fig. 4, the hole 30 of the shovel is in registration with the uppermost hole 17. When in extended position as described, the shovel 11 is approximately in line with the handle 10, suitably to be used as a shovel in an ordinary manner. The shovel 11 may be positioned at an intermediate position as shown in Fig. 3, suitably to be used as a hoe, and when in such position the hole 30 of the shovel is in registration with intermediate hole 17 of the handle.

As shown in Fig. 10 the locking pin is engaged with the shovel only, so that moving the shovel carries the locking pin with it, and does not move any other part. In the position shown in Fig. 11 the locking pin is engaged with the shovel and the pick, so that these parts are locked together so that they can be moved as a unit relatively to the handle 10.

The pick 12 has the two locking holes 21 located so that it can be adjusted to the closed position with the shovel either in the open position, as shown in Figs. 1 and 2, or the closed position as shown in Fig. 4 or can be adjusted to a position at right angles to the handle, as shown in Fig. 3, and on the opposite side of the handle from that of the shovel, as shown in the said figure. Considering the upper and lower holes 21, as shown in Fig. 7 when the shovel and the pick are in alinement, the locking pin 18 is engaged with the lower hole 21 when the pick is in both the closed position, and the right angle position, the said lower hole 21 being however in registration with the lowermost hole 17 in the closed position and with the intermediate hole 17 in the right angle position. When the pick and the shovel are in the closed positions, as shown in Fig. 4, the locking pin 18 passes through the upper hole 21, and the uppermost hole 17.

While other arrangements of locking holes may be used, the particular arrangement shown and described we find to answer the purpose of permitting the necessary changes in the adjustment of the tools and at the same time to involve the least liability to confusion.

We claim as our invention:—

An intrenching tool comprising a handle, a pick member and a shovel member adjustably connected together by a joint comprising a joint head on the said handle, inner ears on one of the said members inclosing the said head, outer ears on the other of the said members inclosing the said inner ears, a pivotal pin passing through the said ears and head, a locking pin carried by the said pivotal pin, and one of the said outer ears having a single hole for the said locking pin, the inner ears opposed to the said last named outer ears having two holes for the said locking pin, and the said head having three holes for the said locking pin.

BERNARD B. NEAL.

Witnesses:
  Jas. B. Fisher,
  A. W. Wachter.

WILLIAM S. THOMSON.

Witnesses:
  Geo. R. Bond,
  E. H. Galpin.